UNITED STATES PATENT OFFICE.

EDWARD E. GRAFF, OF PITTSBURG, PENNSYLVANIA, ASSIGNOR TO DAVID M. McMASTERS, OF SAME PLACE, AND JOHN A. WERNER, OF CHICAGO, ILLINOIS.

PROCESS OF REDUCING IRON ORE.

SPECIFICATION forming part of Letters Patent No. 470,640, dated March 8, 1892.

Application filed March 16, 1891. Serial No. 385,255. (No specimens.)

*To all whom it may concern:*

Be it known that I, EDWARD E. GRAFF, of Pittsburg, in the county of Allegheny and State of Pennsylvania, have invented a new and useful Improvement in the Process of Reducing Iron Ore, of which the following is a full, clear, and exact description.

My invention consists in an improved method of reducing iron ore (oxide of iron) by crushing or pulverizing the iron ore, carbon, and flux, mixing them together in a dry state, and then exposing the mixture to a comparatively low heat in a suitable furnace until the oxygen is sufficiently removed from the iron of the ore to permit it to come to nature, and then gathering the particles of iron or balling it and removing it from the slag formed by the union and meeting together of the flux and non-metallic ingredients of the ore.

For carrying on my improved process I use a furnace capable of being heated by passage over it of heated air or flame to a degree of 1,500° to 1,800° Fahrenheit. The furnace may be of any desired construction; but the hearth should be of a greater width relatively to its depth than is common in puddling and other reducing furnaces commonly used, the object being to expose the mixture of ore, carbon, and flux in a thin layer—say three inches deep or less—to the action of the flame of a fire or heated current of air. The size of the furnace-hearth will therefore depend on the amount of the charge to be heated, as it is important that the layer of material under treatment should be thin.

I prepare the material to be treated as follows: I take oxide of iron in the shape of iron ore and pulverize it, so as to reduce the particles to a size not larger than No. 6 shot, and the finer the better. The carbon which I use may be charcoal, coke, anthracite coal, or bituminous coal. This is ground or otherwise finely pulverized, and I add to it wood sawdust. The flux which I prefer to use is carbonate of lime in the shape of oyster-shells, which are also similarly pulverized. These pulverized ingredients are then intimately mixed together in the following proportions: pulverized ore, one hundred parts, by weight; pulverized coal, (or carbon,) twenty parts, by weight; sawdust, ten parts, by weight; pulverized oyster-shells, four parts, by weight. The batch is then ready for the furnace. I heat the hearth of the furnace to a low heat— say about 1,500° Fahrenheit, but not above 1,800° Fahrenheit—and spread the mixture of ingredients in a dry state over the hearth of the furnace to a depth of say three inches. The heat of the furnace is then kept up for a sufficient space of time (depending on the character of the ore and the temperatures employed) to cause the oxygen of the ore and carbon of the mixture to unite and the flux and earthy matters of the ore to melt and form a liquid slag, when the metallic iron begins to form into globules, which are gathered together with a rabble and removed from the furnace. When all the iron which will separate from the ore has been thus removed, which usually takes about two hours, the process is finished and the slag is run off, thus preparing the hearth for a fresh charge and repetition of the operation. By comminuting the iron ore and other ingredients the reduction is more readily and rapidly effected than by the puddling or other usual process, and a lower degree of heat is required, it not being necessary, as in puddling, to raise the heat before balling. This low temperature greatly aids in preventing the phosphorus, which in the early part of the process unites with the lime of the slag, from returning to the iron, which is a serious practical difficulty in puddling.

Owing to the method practiced of covering the hearth with a thin layer of the material to be treated and the comparatively low degree of heat employed, it will not be necessary to use any special fix or fettling for the hearth of the furnace; but the hearth and walls of the furnace may be thus protected, if desired. The iron after being gathered and removed from the furnace will be found to be metallic iron, which is then squeezed to remove the adherent slag and form it into blooms.

What I claim as my invention, and desire to secure by Letters Patent, is—

1. The process of reducing iron ore consisting in mixing with the pulverized ore pulverized carbon and carbonate of lime, exposing the mixture to a heat below 1,800° Fahrenheit until the iron comes to nature, and then removing the iron and separating it from the slag, substantially as described.

2. The process herein described of reducing iron ore by pulverizing it and mixing it with pulverized carbon—such as coal, charcoal, or coke—woody fiber, and pulverized carbonate of lime, placing the mixed ingredients in a thin layer on the hearth of a heating or other suitable furnace, and exposing it to a comparatively low heat (from 1,500° to 1,800° Fahrenheit) until the iron comes to nature, and then removing the iron from the furnace and removing the adherent slag in the usual manner, substantially as hereinbefore described.

3. The process herein described of reducing iron ore by pulverizing it and mixing it with pulverized carbon—such as coal, charcoal, or coke—woody fiber, and pulverized carbonate of lime in substantially the proportions of one hundred parts, by weight, of ore, twenty parts of carbon, ten parts of wood-fiber, and four parts of carbonate of lime, placing the mixed ingredients in a thin layer on the hearth of a heating or other suitable furnace and exposing it to a comparatively low heat (from 1,500° to 1,800° Fahrenheit) until the iron comes to nature, and then removing it from the furnace and removing the adherent slag in the usual manner, substantially as hereinbefore described.

In testimony whereof I have hereunto set my hand this 12th day of March, A. D. 1891.

EDWARD E. GRAFF.

Witnesses:
W. B. CORWIN,
H. M. CORWIN.